United States Patent [19]

Tobioka

[11] 4,132,467
[45] Jan. 2, 1979

[54] FILM END INDICATING DEVICE FOR MOTION PICTURE CAMERAS

[75] Inventor: Takashi Tobioka, Omiya, Japan

[73] Assignee: Fuji Photo Optical Co., Ltd., Omiya, Japan

[21] Appl. No.: 796,390

[22] Filed: May 12, 1977

[30] Foreign Application Priority Data

May 12, 1976 [JP] Japan .................. 51/59688[U]
May 9, 1977 [JP] Japan .................. 52/52775

[51] Int. Cl.² .................................................. G03B 1/60
[52] U.S. Cl. ..................................... 352/172; 352/175; 352/91 R
[58] Field of Search ............... 352/170, 171, 172, 175, 352/91 R, 91 C, 91 S

[56] References Cited

U.S. PATENT DOCUMENTS

| | | | |
|---|---|---|---|
| 2,450,323 | 9/1948 | Williamson | 352/175 |
| 3,027,800 | 4/1962 | Leuschke | 352/175 |
| 3,494,691 | 2/1970 | Katsuyama | 352/91 S |
| 3,515,473 | 6/1970 | Theer | 352/171 |
| 3,549,249 | 12/1970 | Katsuyama | 352/91 S |
| 3,656,842 | 4/1972 | Theer et al. | 352/91 S |
| 3,701,593 | 10/1972 | Nozawa | 352/91 S |
| 3,782,813 | 1/1974 | Isono | 352/171 |
| 3,918,802 | 11/1975 | Sakaguchi | 352/172 |
| 4,030,820 | 6/1977 | Nishizawa | 352/91 C |

Primary Examiner—Monroe H. Hayes

[57] ABSTRACT

In a motion picture camera in which films of different length can be loaded, a film end indicating device is provided to indicate that the film has come to its end regardless of its length. The film end indicating device is comprised of an indicator and a plurality of end detectors attached to a footage counter in the camera to detect the end of the film of different length respectively. A change-over lever is provided between the indicator and the plurality of end detectors to selectively connect one of the detectors to the indicator according to the length of the film.

10 Claims, 4 Drawing Figures

FILM END INDICATING DEVICE FOR MOTION PICTURE CAMERAS

BACKGROUND OF THE INVENTION

1. Field of the Invention

This invention relates to a film end indicating device for a motion picture camera, and more particularly to a device in a motion picture camera for indicating that the film loaded in the camera has come to its end. This invention is particularly applicable to a motion picture camera in which more than one kind of film or film cartridge of different length can be loaded.

2. Description of the Prior Art

It has been known in the art to provide a film end indicating device in a motion picture camera. In one type of the film end indicating device, there is provided an indicating member which appears in the visible field of a viewfinder of the camera when the film has come to its end. In another type of the film end indicating device, there is provided a light emitting element such as a light emitting diode or a lamp in the visible field of the viewfinder of the camera. The light emitting element is turned on when the film has come to its end.

In both of the above described types of the conventional film end indicating device for a motion picture camera, the film end is detected only for one kind of film length, i.e. 50ft. In other words, since there have been used only one kind of motion picture film having a length of 50 feet, the film end indicating device is designed to detect the end of the one kind of film.

On the other hand, it has recently been proposed to provide a motion picture camera in which more than one kind of film of different length can be loaded. In the motion picture camera in which various length of film can be used, the conventional film end indicating device is not always useful. Particularly, it is known to provide a motion picture camera in which a 50ft. type film cartridge and a 200ft. type film cartridge can be loaded. Therefore, it is desired to provide a film end indicating device which can be incorporated into a motion picture camera and is able to detect and indicate the end of the film of at least two kinds of length, e.g. 50 ft. and 200 ft.

Although it is considered possible to detect the end of the film of different length by marking or notching the film end portion and providing a detecting means in the passage of the film to detect the mark or notch provided on the film, this will make the structure of the camera mechanism complicated and enlarge the size of the camera.

SUMMARY OF THE INVENTION

It is therefore the primary object of the present invention to provide a film end indicating device for a motion picture camera which is capable of indicating that the film has come to its end regardless of the type of length of the film.

Another object of the present invention is to provide a film end indicating device for a motion picture camera which is capable of indicating the film end regardless of the length thereof and is small in weight and simple in structure.

Still another object of the present invention is to provide a film end indicating device for a motion picture camera which is capable of indicating the film end regardless of the length thereof and can be manufactured at a low cost.

The film end indicating device for a motion picture camera in accordance with the present invention is comprised of a plurality of detecting means associated with a footage counter of the camera to detect the film end of different type of films, and a change-over means for selectively making one of the plurality of detecting means operable according to the type of the film. The detecting means selected functions to operate an indicating means to indicate the film end when the film has come to an end. The indicating means may be a mechanical indicator or an electrical indicator. The change-over means may be manually operated or automatically operated.

DESCRIPTION OF THE PREFERRED EMBODIMENTS

Figure 1:
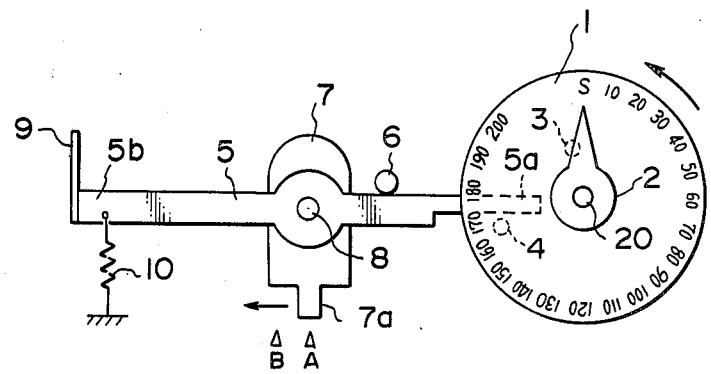
FIG. 1 is a plan view showing an embodiment of the film end indicating device in accordance with the present invention.

One embodiment of the present invention which has a very simple mechanical structure and is completely mechanically operated is illustrated in FIG. 1. A footage counter 1 which carries thereon numerals to indicate the footage of the film used is rotatably mounted on a pin 20. A pointer 2 which indicates the footage of the film on the counter 1 is fixed to the pin 20. The rotatable footage counter 1 carries on the back side thereof two pins 3 and 4 fixed thereto at different positions of different distance from the pin 20. The two pins 3 and 4 are at angularly different positions, one for the film of 50 ft. and the other for the film of 200 ft. The footage counter 1 is rotated in the counterclockwise direction as indicated by an arrow as the film in the motion picture camera is fed from the film feed-out reel to the film take-up reel in a film cartridge. The mechanism interconnecting the film feeding means and the footage counter 1 is not shown in the drawing since it is well known in the art.

An end detecting lever 5 is pivotally mounted on a pin 8 fixed to a change-over member 7. The end detecting lever 5 is spring urged counterclockwise by a tension spring 10 and the counterclockwise rotation thereof is limited by a stopper 6. The end detecting lever 5 has at its end an engaging portion 5a engageable with one of said pins 3 and 4, and has at its opposite end 5b an indicator 9 which is brought into the visual field of a viewfinder of the camera when the end detecting lever 5 rotates clockwise. The change-over member 7 is slidable back and forth between two positions, first position where the change-over knob or projection (hereinafter simply referred to as "knob") 7a is at index A and second position where the knob 7a is at index B. When the knob 7a is at index A (first position), the engaging portion 5a of the end detecting lever 5 is engageable with the first pin 3, and when the knob 7a is at index B (second position) the engaging portion 5a is engageable only with the second pin 4.

When the 50 ft. type film is loaded in the camera, the change-over member 7 is slid to the right to bring the knob 7a into alignment with index A so that the engaging portion 5a stops the first pin 3 carried by the footage counter 1. When the 200 ft. type film is loaded in the camera, the change-over member 7 is slid to the left to bring the knob 7a into alignment with index B so that the engaging portion 5a stops the second pin 4 when the footage counter 1 rotates counterclockwise and the film of 200 ft. has come to its end. When the engaging portion 5a of the end detecting lever 5 stops the pin 3 or 4, the right hand arm of the lever 5 is pushed down by the pin 3 or 4 and the left hand arm of the lever 5 is moved upward in FIG. 1 to move the indicator 9 into the visual field of the viewfinder (not shown). Thus, the indicator 9 is brought into the viewfinder when the film has come to its end regardless of its length.

In the above described embodiment in which all elements are mechanically operated, it will be noted that the engaging portion 5a may be replaced by a lead switch or a Hall effect element which detects the coming of the pin 3 or 4 made of magnetic material and that the indicator 9 may be replaced by a light emitting element. In this case, the lever 5 may not be swung but only be slidable back and forth.

Figure 2:
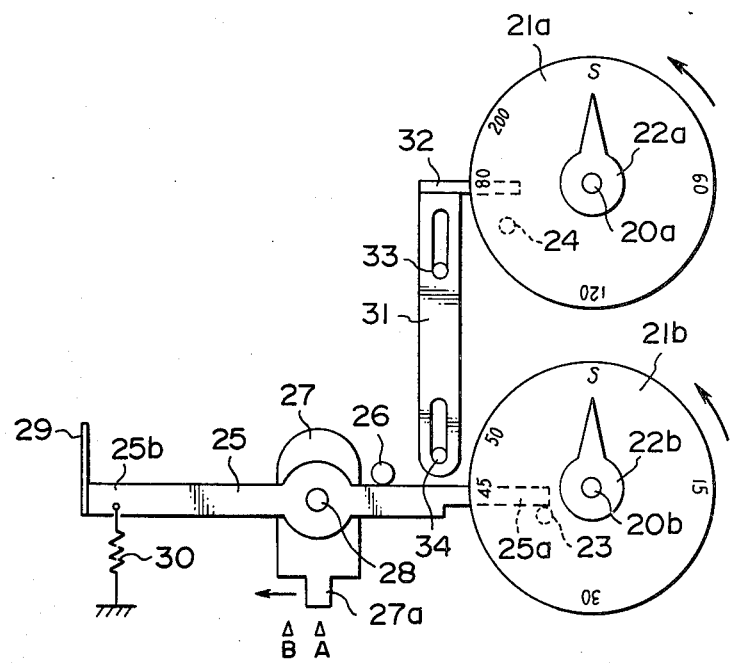
FIG. 2 is a plan view showing another embodiment of the invention.

A second embodiment constituted by mechanical elements will now be described in detail with reference to FIG. 2. In the embodiment shown in FIG. 2, footage counters 21a and 21b are separately provided for metering the two kinds of film. The first footage counter 21a meters the film loaded in a film cartridge of 200 ft. type. The second footage counter 21b meters the film loaded in a film cartridge of 50 ft. type. The first footage counter 21a has a pointer 22a fixed to a pin 20a and carries on the back face thereof a pin 24 in quite the same manner as in the first embodiment shown in FIG. 1. The second footage counter 21b has a pointer 22b fixed to a pin 20b and carries a pin 23 similarly as shown in FIG. 2. The pin 23 is fixed to the back face of the second footage counter 21b at a position different from the corresponding position of said pin 24 carried by the first footage counter 21a. The difference between the two positions is quite the same as in the first embodiment. In the second embodiment, the elements 25, 25a, 25b, 26, 27, 27a, 28, 29 and 30 all correspond to the elements 5, 5a, 5b, 6, 7, 8, 9, and 10 of the first embodiment shown in FIG. 1, respectively, and accordingly, the detailed description thereof is omitted here.

In the second embodiment, a long-film end detecting member 31 is provided in addition to the end detecting layer 25. The long-film end detecting member 31 is slidable guided by a pair of pins 33 and 34 and has at its end an engaging portion 32 to be engaged with the pin 24. The long-film end detecting member 31 is further engageable with the end detecting lever 25 on the right hand arm thereof so that the end detecting lever 25 is swung clockwise when the long-film end detecting member 31 is slid downward by the engagement thereof with said pin 24 of the first footage counter 21a. When the first footage counter 21a is rotated counterclockwise and the pin 24 fixed thereto comes to push the engaging portion 32 of the long-film end detecting member 31, the latter is moved downward to have the end detecting lever 25 swing clockwise and consequently make the indicating member 29 move into the visual field of the viewfinder. When a film of 50 ft. type is loaded in the camera, the change-over member 27 is slid to the right where the knob 27a is in alignment with index A. In this state, the pin 23 fixed to the second footage counter 21b is engaged with the right hand arm 25a of the lever 25 when the film comes to its end. When the camera is loaded with a 200 ft. type film, the change-over member 27 is moved to the left where the knob 27a is at index B. In this state, the pin 23 of the footage counter 21b is not engaged with the right hand arm 25a of the lever 25. Thus, in this case, only when the footage counter 21a comes to the position where the pin 24 fixed thereto is engaged with the engaging portion 32, the lever 25 is swung clockwise. Thus, the end of the film of different type is detected and indicated.

Figure 3:
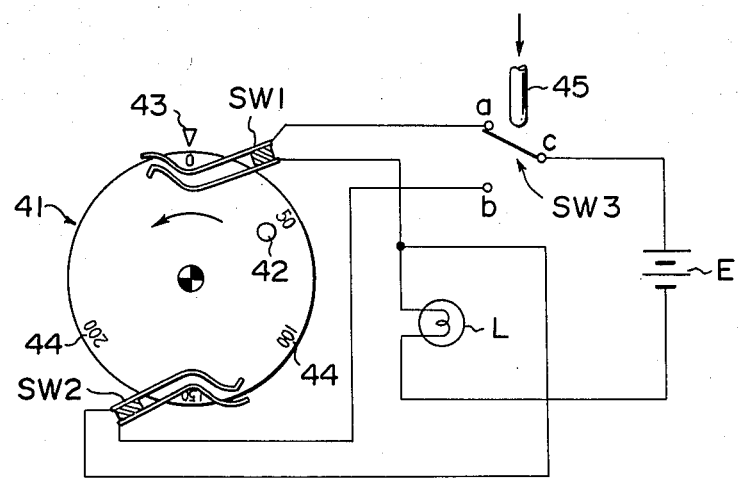
FIG. 3 is a schematic diagram showing still another embodiment of the invention in which an electrically operated indicator is employed.

The above described embodiments are comprised of mechanical elements. However, it is possible to apply the film end indicating device in accordance with the present invention to an electric circuit including an electrically operated indicator. One example of this kind of device will be described referring to FIG. 3. A footage counter 41 rotatably provided in the camera carries a pin 42 fixed thereto. The footage counter 41 further carries footage indicating numerals of 0, 50, 100, 150 and 200 at equal angular intervals of 60° so that the numerals "50" and "200" are in the opposite positions. The film footage counter 41 is rotated counterclockwise in FIG. 3 as indicated by an arrow. An index 43 is fixedly provided at a position outside the counter 41 to show the footage of the film exposed. A pair of switches SW1 and SW2 are provided at such positions that the switches are closed by the pin 42 as the footage counter 41 rotates. In the embodiment shown, the pin 42 is located at the position of the numeral "50" and the pair of switches SW1 and SW2 are located at the positions of the numerals "0" and "150" respectively when the numeral "0" is at the position of the index 43. Consequently, when the film of 50 feet length has been used, the first switch SW1 is closed by the pin 42, and when 200 feet of the film has been used the second switch SW2 is closed thereby. The switches SW1 and SW2 may be replaced by non-contact switches such as photocouplers. In such a case, the footage counter 41 is provided with a through hole at the position of said pin 42.

The switches SW1 and SW2 are both connected with a power source E and an indicator lamp L by way of a change-over switch SW3. The change-over switch SW3 consists of a common terminal c and selected terminals a and b which are selectively put into contact with the common terminal c by means of a change-over pin 45. The pin 45 may be manually operated or automatically operated by insertion of a film cartridge which has an index to indicate the length of the film and functions to selectively operate the change-over pin 45. When the 50 feet type film is loaded in the camera, the change-over pin 45 is in the position to let the terminal a be in contact with the common terminal c and make the first switch SW1 operable. When the 200 feet type film is loaded, the change-over pin 45 is in the position to put the terminal b into contact with the common terminal c and make the second switch SW2 operable. Thus, when the 50 feet type film is loaded in the camera, the switch SW1 is closed to turn on the lamp L when the film has come to its end. When the 200 feet type film is loaded in the camera, the second switch SW1 is closed to turn on the lamp L when the film has come to its end.

In the above described embodiment, the lamp L may be of course replace by a light emitting diode or a neon tube. Further, it is also possible to substitute an oscillator connected with an intermittently lighting element for the lamp.

Figure 4:
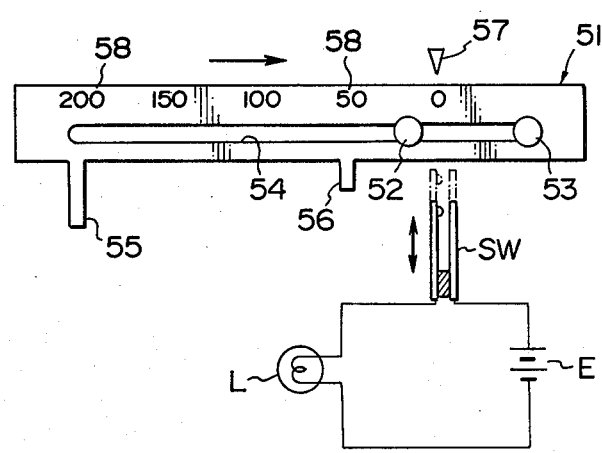
FIG. 4 is a plan view showing still another embodiment of the invention in which an electrically operated indicator is employed.

FIG. 4 shows another embodiment wherein an electric circuit is employed. In this embodiment, only one switch SW is employed. A slidable plate 51 guided by a pair of pins 52 and 53 at its slot 54 is provided with two engaging projections 55 and 56 of different length. In this embodiment, the slidable plate 51 is slid from left to right and carries film footage indicating numerals 58 which increases from right the left as shown in FIG. 4. A fixed index 57 is provided by the slidable plate 51 to indicate the exposed length of the film as the film is fed in the camera. The switch SW is movable in the direction in which said two projections 55 and 56 extend. The switch SW is movable between a first position where the switch SW is closed by the first projection 56 when the 50 feet of film has come to its end and a second position where the switch SW is closed only by the second projection when the 200 feet of the film has come to its end. The switch SW is connected in series with a lamp L and a power source E. Thus, the lamp L is turned on when the switch SW is closed. By selecting the position of the switch SW, the indication of the end of the film of different type is made.

I claim:

1. A film end indicating device for a motion picture camera in which more than one kind of film of different length can be loaded and the exposed length of the film is indicated by a footage counter connected with a film feeding mechanism, said film end indicating device comprising a single movable member connected with the film feeding mechanism by way of a single gear train having a certain gear ratio, a plurality of film end detecting means selectively put into operable condition where one of said plurality of film end detecting means cooperates with the movable member to detect the end of the film, a film end indicating means connected with said film end detecting means for indicating that the film has come to its end in response to detection of the film end by one of said film end detecting means, and a change-over means operated to selectively put one of said plurality of film end detecting means into operable condition according to the length of the film.

2. A film end indicating device for a motion picture camera as defined in claim 1 wherein said film end indicating means is an indicator which is brought into the visual field of a viewfinder of the camera in response to detection of the film end by one of said film end detecting means.

3. A film end indicating device for a motion picture camera as defined in claim 2 wherein said plurality of film end detecting means comprises a film end detecting lever connected with said indicator and moved to a position to bring said indicator into the visual field of the viewfinder when the film has come to its end, and a plurality of pins fixed to the footage counter of the camera one of which is selectively put into engagement with said film end detecting lever to move the lever to said position when the film has come to its end, and said change-over means comprises means to selectively put said end detecting lever into engagement with one of said pins according to the length of the film loaded in the camera.

4. A film end indicating device for a motion picture camera as defined in claim 3 wherein said pins are fixed to a rotatable footage counter at different positions separated radially and angularly with respect to the center of rotation of the footage counter, and said film end detecting lever extends in the radial direction of the footage counter and is movable in the radial direction to be selectively put into engagement with said pins so that the lever is moved by only one of the pins.

5. A film end indicating device for a motion picture camera as defined in claim 2 wherein said plurality of film end detecting means comprises a film end detecting lever connected with said indicator and moved to a position to bring said indicator into the visual field of the viewfinder when the film has come to its end, a film end detecting member engageable with said film end detecting lever to move the film end detecting lever into said position when said film end detecting member is moved from one position to a second, a first footage counter for one kind of film length which has a pin engageable with said film end detecting member to move the member into engagement with said film end detecting lever when the footage counter comes to the position to indicate the end of the film of said one kind, a second footage counter for another kind of film length which has a pin engageable with said film end detecting lever to move the lever into said position to bring said indicator into the visual field of the viewfinder of the camera, and said change-over means comprises means to selectively move said film end detecting lever between two positions in one of which said film end detecting lever is not engageable with the pin of said second footage counter and in the other of which said film end detecting lever is engageable with the pin of the second footage counter.

6. A film end indicating device for a motion picture camera as defined in claim 1 wherein said film end indicating means is an electrically operated light emitting element which is turned on when the film has come to its end.

7. A film end indicating device for a motion picture camera as defined in claim 6 wherein said film end detecting means comprises a plurality of switches connected with said light emitting element and a power source, and said change-over means comprises a change-over switch connected between said film end detecting switches and said light emitting element, said plurality of switches being connected with said footage counter so that one of the plurality of switches is selectively closed according to the length of the film counter by the footage counter.

8. A film end indicating device for a motion picture camera as defined in claim 7 wherein said footage counter is a rotatable counter having a pin fixed thereon and said plurality of switches are provided at positions along the periphery of the rotatagle counter so that the switches are closed one by one by the pin on the footage counter as the counter rotates.

9. A film end indicating device for a motion picture camera as defined in claim 6 wherein said film end detecting means comprises a switch connected between said light emitting element and a power source, and a plurality of pins fixed to a movable footage counter in the camera which are selectively put into engagement with said switch to close the same as the footage counter moves, and said change-over means comprises means for moving said switch between a position where one of said pins is engageable with the switch and another position where another of said pins is engageable with the switch.

10. A film end indicating device for a motion picture camera as defined in claim 9 wherein said movable footage counter is a slidable member which slides in one direction as the film in the camera is fed and brings said pins fixed thereto into selective engagement with said switch.

* * * * *